United States Patent [19]

Hsu

[11] Patent Number: 5,046,000

[45] Date of Patent: Sep. 3, 1991

[54] SINGLE-FIFO HIGH SPEED COMBINING SWITCH

[75] Inventor: Yarsun Hsu, Pleasantville, N.Y.

[73] Assignee: International Business Machines Corporation, Armonk, N.Y.

[21] Appl. No.: 303,699

[22] Filed: Jan. 27, 1989

[51] Int. Cl.[5] .......................... G06F 13/00; G06F 7/00
[52] U.S. Cl. ................................ 364/200; 364/244.3; 364/239.7; 364/284.1; 364/284.3
[58] Field of Search ... 364/200 MS File, 900 MS File; 370/60, 61, 93, 94.1

[56] References Cited

U.S. PATENT DOCUMENTS

| | | | |
|---|---|---|---|
| 4,484,262 | 11/1984 | Sullivan et al. | 364/200 |
| 4,630,258 | 12/1986 | McMillen et al. | 370/94.1 |
| 4,672,220 | 6/1987 | Haberl . | |
| 4,747,103 | 5/1988 | Iwamura . | |
| 4,799,152 | 1/1989 | Chuang et al. | 364/200 |
| 4,920,484 | 4/1990 | Ranade | 364/200 |
| 4,922,486 | 5/1990 | Lidinsky et al. | 370/94.1 |
| 4,922,488 | 5/1990 | Niestegge | 370/94.1 |

OTHER PUBLICATIONS

"Data Communications Receive Process Queuing", by D. M. O'Neal et al., IBM Technical Disclosure Bulletin, vol. 21, No. 7, Dec. 1978.
"Node Processor for Distributed System Control", by J. G. Sam, IBM Technical Disclosure Bulletin, vol. 23, No. 5, Oct. 1980.
"Design of a Combining Network for the RP3 Project", by Yarsun Hsu et al., International Symposium VSLI Technology Systems and Applications, 1987 pp. 349-353.
"High Performance Microprocessor Memory System", by S. J. Ramer et al., IBM Technical Disclosure Bulletin, vol. 21, No. 3, Aug. 1988.

*Primary Examiner*—Michael R. Fleming
*Assistant Examiner*—Debra A. Chun
*Attorney, Agent, or Firm*—Perman & Green

[57] ABSTRACT

A combining switch 10 includes a two input multiplexer 12 which receives I and J inputs from data processors and directs one of the incoming messages, if there are no contentions of congestions at a switch output port 14 and a Queue FIFO 16 is empty, directly to the output port 14 for transmission to one of a plurality of memory modules. If the output port 14 is busy and the Queue 16 is empty the incoming message is routed to the Queue FIFO 16 for storage. If the Queue FIFO 16 is not empty the incoming message is first compared by a comparator 20 to all existing messages stored in the Queue FIFO 16 to determine if the incoming messasge is destined for a memory address which already has a queued message. If no match is determined by comparator 20 the incoming message is routed to the Queue FIFO 16 for storage. If comparator 20 determines that the memory address and operation type of the incoming message matches that of a message already stored in the Queue FIFO 16 both the incoming message and the queued message are applied to a message combining ALU 26. The ALU 26 generates a combined message which is stored at the same Queue 16 location as the queued message which generated a comparison match with the incoming message.

18 Claims, 2 Drawing Sheets

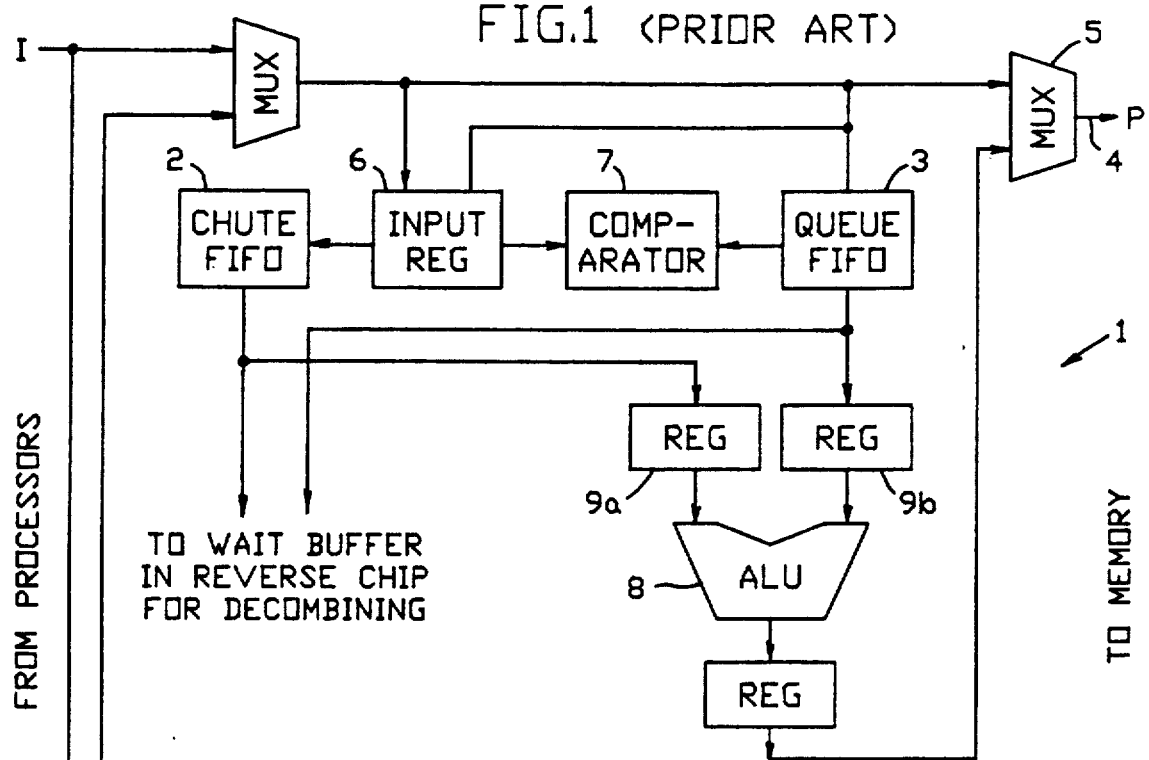
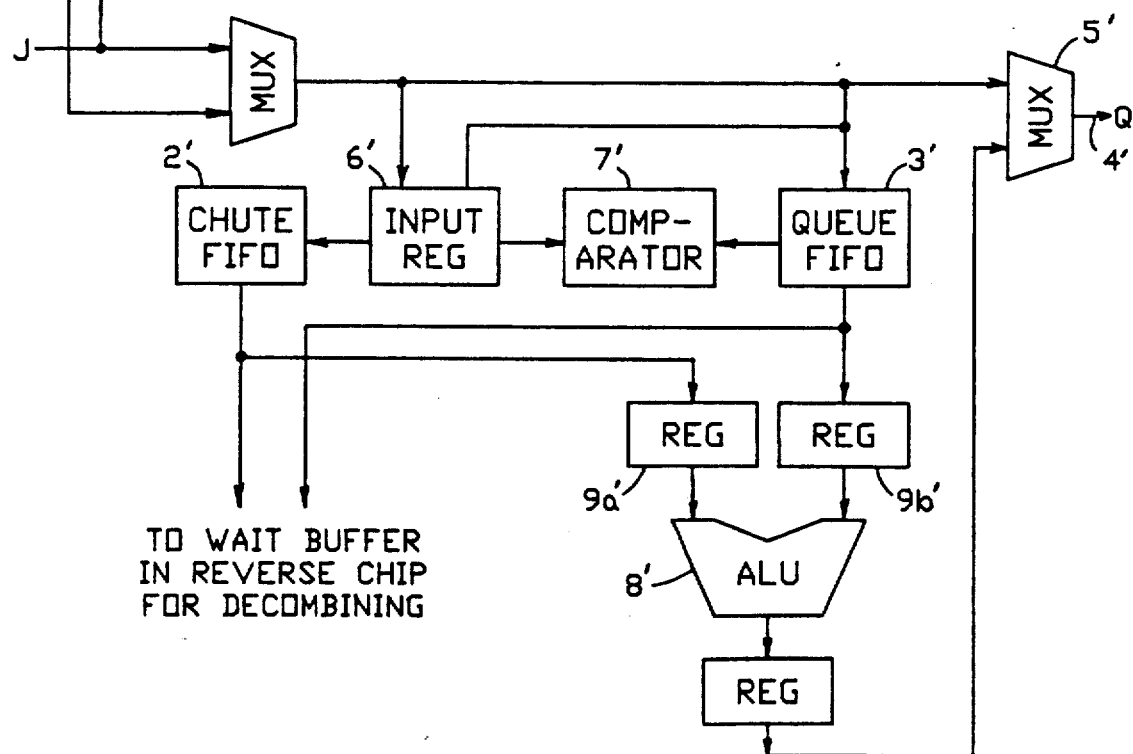

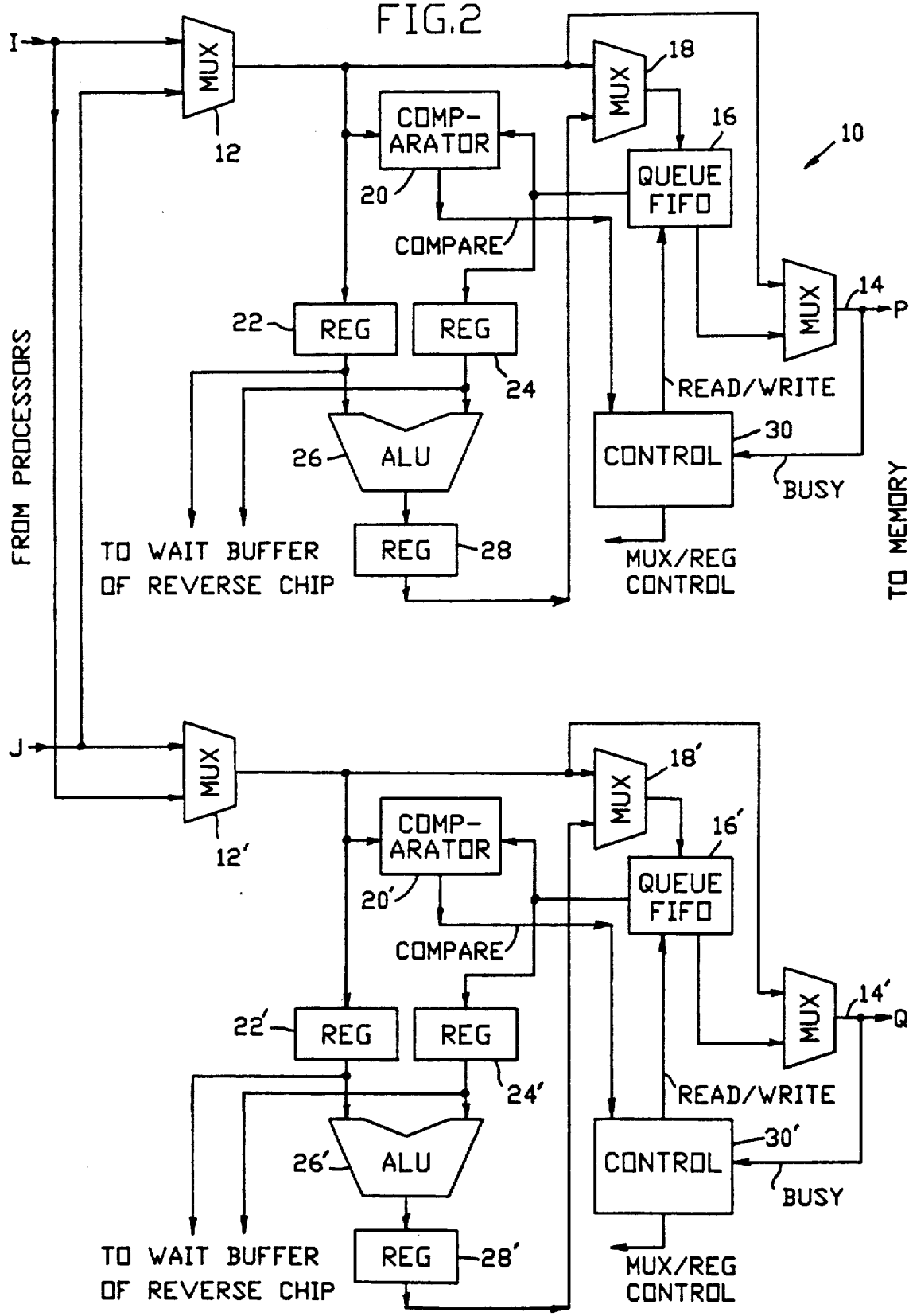

SINGLE-FIFO HIGH SPEED COMBINING SWITCH

FIELD OF THE INVENTION

This invention relates generally to data switching apparatus and, in particular, to a high speed data combining switch which employs, for each half, a single first-in/first-out (FIFO) buffer having an output coupled to a switch output port.

BACKGROUND OF THE INVENTION

Some multi-processor data processing systems include a number of data processors coupled to a number of memory modules through an interconnection network. The interconnection network may employ an Omega-type switch which includes log(n) stages of n/2 two-by-two switches, where n represents the number of ports being serviced by the switch. One type of switch is known as a combining switch which is used to combine multiple messages which are addressed to the same memory location in order to reduce the number of accesses to that memory location. By combining messages the effects of "hot spot" loading are reduced and the bandwidth of the interconnection network is increased. A decombining switch is subsequently employed to "decombine" responses from memory modules and transmit the responses back to the processors.

FIG. 1 illustrates a conventional 2×2 combining switch 1 comprised of two substantially identical halves. For convenience only one half of the switch will be discussed, the corresponding structure in the other switch half being designated by a primed reference number. Each switch half includes two FIFO register files, one being known as a Chute FIFO 2 and the other being known as a Queue FIFO 3. The Chute and Queue FIFOs each have an equal number of storage locations and are employed to store messages before transmission to the network of memory modules (not shown). Typically, if there are no contentions or congestions at the switch output port 4 and the Queue 3 is empty, incoming processor messages from input ports I and J are routed directly to the output port 4 via a multiplexer 5. If the Queue 3 is not empty the incoming message is temporarily stored in an input register 6 and compared by a comparator 7 to all existing messages in the Queue to determine if the incoming message is directed to a memory location already associated with a queued message. If a match is not found the incoming registered message is stored in the next available location within the Queue FIFO 3. If a match is detected by the comparator 7 the incoming message is stored instead in the Chute FIFO 2 at a location corresponding to the storage location of the matched message in the Queue 3. Subsequently both the Chute and Queue messages are directed to an arithmetic logic unit (ALU) 8, via ALU input registers 9a and 9b, to combine and generate a single message. Information required for decombining the message on its return from the memory module is sent to a Wait Buffer in an associated decombining switch (not shown).

One significant disadvantage of such conventional combining switches is that the Chute FIFO register file occupies a significant portion of available integrated circuit area. For example, it can be shown that the Chute FIFO 2 can occupy thirty six percent of the data path area as compared to approximately forty five percent for the Queue and ten percent for the ALU. This significant area requirement, and the associated power requirement, for the Chute is especially disadvantageous if the majority of messages sent through the network are not combinable, resulting in only infrequent use of the Chute FIFO.

Another significant disadvantage of such conventional combining switches is that all output from the Queue, whether or not there is a corresponding entry in the Chute, is directed through the ALU. Thus, some finite amount of time is required for the message to pass through the ALU even for those messages which are not combined.

Typically an interconnection network is comprised of a plurality of 2×2 combining switches, such as an 8×8 network. It can therefore be appreciated that an improved packing density, higher speed and reduced power consumption of each of the 2×2 switches would result in an overall improvement in network performance.

It is therefore one object of the invention to provide a combining switch which operates at a higher speed than conventional combining switches.

It is another object of the invention to provide a combining switch which, for each switch half, includes only a Queue FIFO register and which directs messages directly from the Queue FIFO to the switch output port.

It is still another object of the invention to provide a combining switch which has a significant reduction in required integrated circuit surface area, which requires less operating power, and which operates at a higher speed than conventional combining switches.

SUMMARY OF THE INVENTION

The foregoing problems are overcome and the objects of the invention are realized by a data switching apparatus, specifically a combining switch having two halves, each of which includes an input port, an output port, a Queue FIFO, a comparator and an ALU. The input port receives data such as messages from data processors and directs incoming messages, if the output port is not busy and the Queue FIFO is empty, directly to the output port for transmission. If the output port is busy and the Queue FIFO is empty the incoming message is routed to the. Queue FIFO for storage. If the Queue FIFO is not empty the incoming message is first compared by the comparator to all existing messages stored in the Queue FIFO to determine if the incoming message is destined for transmission to a memory location which already has a queued message. If no match is determined by the comparator the incoming message is routed to the Queue FIFO for storage. If the comparator determines that the destination location and typically also the operation type of an incoming message matches that of a message already stored in the Queue FIFO both the incoming message and the queued, matching message are applied to the message combining ALU. The ALU generates a combined message which is stored at the same Queue FIFO location as the queued message which generated the comparison match with the incoming message.

In accordance with a method of the invention there is disclosed a method of operating a message combining switch in a data processing system of the type which includes a plurality of data processors which are coupled to a plurality of memory locations through a switching network, the data processors generating messages relative to identified ones of the memory locations. The message combining switch includes two halves each of which has a message storage unit, an input port and an output port. The method includes the steps of receiving a message from the input port and, if the message storage unit has at least one message stored within, comparing an identification of a memory location and an operation type associated with the received message to the identification of memory locations and operation types associated with messages stored in the message storage unit. If the memory location identification and operation type associated with one of the stored messages is determined to be equal to the memory location identification and operation type associated with the received message the method further includes the steps of combining the received message and the stored message to generate a combined message and replacing the stored message with the combined message.

BRIEF DESCRIPTION OF THE DRAWING

The above set forth and other features of the invention will be made more apparent in the ensuing Detailed Description of the Invention when read in conjunction with the attached Drawing, wherein:

FIG. 1 is a simplified block diagram of a forward path of a 2×2 combining switch of the prior art having both Queue and Chute FIFO registers and ALUs through which all output of the Queue FIFOs are directed; and FIG. 2 is a simplified block diagram of forward path of a 2×2 combining switch which, in accordance with the invention, includes for each half only a single FIFO register, specifically the Queue FIFO, which has an output directly coupled to an output port of the switch.

DETAILED DESCRIPTION OF THE INVENTION

Referring now to FIG. 2 there is shown a forward path of a 2×2 combining switch 10 constructed in accordance with the invention, it being realized that the switch includes two halves which are constructed in substantially identical fashion. As such, only the upper half of the switch 10 will be discussed, corresponding structure of the lower half of the switch 10 being indicated with a primed reference numeral. Switch 10 includes two input nodes or ports which are coupled to a two input multiplexer 12 which receives I and J message inputs from data processors (not shown) either directly or through a data concentrator. If the switch 10 is located at one of the inner stages of a log(n) switching network the I and J inputs are coupled to the outputs of a combining switch 10 of a previous stage. Multiplexer 12 directs one of the incoming messages, if there are no contentions or congestions at a switch output node 14, and a Queue FIFO 16 is empty, directly to the output port 14 and eventually to one of a plurality of memory modules (not shown). If the output port 14 is busy and the Queue 16 is empty the incoming message is routed to the Queue FIFO 16 for storage via a two input multiplexer 18. However, if the Queue FIFO 16 is not empty, indicating that other outgoing processor messages are stored therein, at least an address portion and more typically both the address and an operation code portion of the incoming message are first compared by a comparator 20 to corresponding portions of all existing messages stored in the Queue FIFO 16. A determination is thus made if the incoming message is destined for a memory address location which already has a queued message. As was stated, in addition to comparing the address location portion or field of the message the comparator 20 typically also compares the operation type portion or field of the message such that only those messages which are directed to the same memory location and which perform the same type of operation, such as READ, WRITE or FETCHANDADD, are combined. So long as the Queue FIFO 16 is not empty this comparison occurs whether or not the output port 14 is busy. If no match is determined by comparator 20 between the memory address and the operation type associated with the received message and the memory addresses and operation types associated with the queued messages the received message is routed through multiplexer 18 to the Queue FIFO 16 for storage. If comparator 20 determines that the memory address and operation type of the incoming message matches that of a message already stored in the Queue FIFO 16 both the incoming message and the matching queued message are each temporarily stored in an associated register 22 and 24, respectively, for application to a message combining ALU 26. The registered messages are also supplied to a Wait Buffer of an associated message decombining switch (not shown) for later decombination of a message returned from the memory. The ALU 26 generates a combined memory module message which is temporarily stored by ALU output register 28 and which is applied to a second input of multiplexer 18 for storage within the Queue 16. As an example, if both the received message and a queued message indicate a FETCHANDADD operation at the same memory address, the ADD operand of each message are summed by the ALU 26 to generate a single message to that memory location.

In accordance with one aspect of the invention, the combined message from ALU 26 is stored at the same Queue FIFO 16 location as the existing Queue message which generated a comparison match with the incoming message. Thus, the existing message is over-written and replaced by the combined message. Subsequently the queued messages are extracted from the Queue 16 in a first-in/first-out manner for application to the output port 14 as the output port 14 becomes available for transmission to the memory modules or further stages of the switching network.

The switch 10 also includes a control logic block 30 which is responsive to a comparator 20 output signal and a busy condition of the output port 14 to control the operation, in the manner described above, of the FIFO 16 and the various multiplexers and registers. In addition, the switch 10 includes further logic for determining if the incoming message should be directed to port P or Q. The switch typically also includes logic including protocol signals for communicating with preceding and following 2×2 switches.

As can readily be seen the combining switch 10 of the invention eliminates both of the Chute FIFOs 2 of the conventional switch of FIG. 1. This elimination of the Chute FIFOs furthermore eliminates, for example, eight transistors per FIFO storage cell. Assuming a six storage location deep by four word wide FIFO, each word being 32 bits in length, a total of 6,144 transistors are eliminated for the one half of the combining switch or a total of 12,288 transistors for the entire combining switch 10. As a result, a significant savings in integrated circuit surface area and combining switch power consumption is achieved.

Furthermore, in that incoming messages are routed through the ALU 26 only if there is a match with a queued message, a considerable speed advantage is realized over the conventional combining switch of FIG. 1. That is, the Queue 16 output is coupled directly to the output port 14 multiplexer instead of being coupled to the input of the ALU 26. In the conventional combining switch of FIG. 1 all outgoing messages are sent through the ALU to the output port from the Queue and Chute FIFOs regardless of whether the message requires combination. As such, the conventional combining switch incurs for each output message a propagation delay associated with passage through the ALU.

While the invention has been particularly shown and described with respect to a preferred embodiment thereof, it will be understood by those skilled in the art that the foregoing and other changes in form and details may be made therein without departing from the spirit and scope of the invention.

Having thus described my invention, what I claim as new, and desire to secure by Letters Patent is:

1. Digital switching apparatus having an input node means and an output node means, comprising:

storage means having a plurality of storage locations for storing messages received from the input node means prior to transmission of the messages to the output node means, a first portion of a message including an identification of a destination for a second portion of the message;

comparator means, having a first input coupled to the input node means and a second input coupled to the storage means, for comparing the first portion of a received message to the first portions of all previously received messages, if any, that are stored within the storage means, the comparator means having an output for indicating if the first portion of the received message matched a first portion of a stored message;

combining means, coupled to the output of the comparator means, having a first input coupled to the input port means and a second input coupled to the storage means, for combining the second portion of a received message with the second portion of the stored message that caused the comparator means to generate the output signal, the combining means having an output for expressing the combined second portions; and means, coupled to the output of the combining means for directing the combined second portions from the output of the combining means to the storage means for storage at a location wherein the stored message which generated a match with the received message is stored.

2. Digital switching apparatus as set forth in claim 1 and further comprising coupling means for coupling an output of the storage means to the output node means for providing stored messages thereto.

3. Digital switching apparatus as set forth in claim 1 and further comprising coupling means for coupling a received message from the input node means to the output node means if the storage means is empty and if the output node means is available for use.

4. Digital switching apparatus as set forth in claim 1 and further comprising coupling means for coupling the input node means to the storage means for storing the received message at an available storage location within the storage means, the coupling means being responsive to the comparing means output for coupling the received message from the input node means to the storage means when the comparing means output indicates that the first portion of the received message does not match the first portion of a stored message.

5. Digital switching apparatus as set forth in claim 1 wherein the storage means includes a first-in/first-out storage means.

6. Digital switching apparatus as set forth in claim 1 wherein the received message is expressive of a message generated by one of a plurality of data processors for storage within one of a plurality of memory modules, and wherein the first portion is expressive of an identification of a storage location address of one of the memory modules.

7. Digital switching apparatus as set forth in claim 1 wherein the combining means includes an arithmetic/logic unit.

8. Digital switching apparatus as set forth in claim 1 wherein the first portion further includes a description of an operation to be performed with the second portion.

9. In a data processing system of the type that includes a plurality of data processors which are coupled to a plurality of memory modules through a switching network, the data processors each generating messages for storage within the memory modules, the switching network including a message combining switch having an input node means coupled to at least one data processor and an output node means coupled to at least one memory module, the message combining switch comprising:

storage means having a plurality of storage locations for storing messages received from the input node means prior to transmission of the messages to the output node means;

comparator means, having a first input coupled to the input node means and a second input coupled to the storage means, for comparing a received message to all previously received messages, if any, which are stored within the storage means, the comparator means having an output for indicating at least if a received message is addressed to a same memory module storage location as one of the stored messages and, if so, if the received message also has a same type of operation code as the stored message that is addressed to the same memory module storage location;

combining means, having a first input coupled to the input node means and a second input coupled to the storage means, for combining an operand portion of the stored message with an operand portion of the received message, the combining means being responsive to the comparator means output for generating at an output thereof a combined message, the combined message being a combination of the received message and the stored message that is addressed to the same memory storage location as the received message and that also has the same operation code; and means, coupled to the output of the combining means and also to the storage means, for replacing the stored message with the combined message.

10. A message combining switch as set forth in claim 9 wherein the storage means has an output coupled to the output node means for providing stored messages thereto.

11. A message combining switch as set forth in claim 9 and further comprising means for coupling a received message from the input node means to the output node means if the storage means is empty and if the output node means is available for use.

12. A message combining switch as set forth in claim 9 and further comprising means for coupling the input node means to the storage means for storing the received message at an available storage location within the storage means, the coupling means being responsive to the operation of the comparing means for coupling the received message from the input node means to the storage means when the comparing means indicates that the received message is not addressed to a same memory module storage location as any of the stored messages or, if the received message is addressed to a same memory module storage location, if the operation code of the received message is not the same as the operation code of the stored message that is addressed to the same memory module storage location.

13. A message combining switch as set forth in claim 9 and further comprising a plurality of output signals for coupling to an associated decombining switch.

14. In a data processing system of the type that includes a plurality of data processors coupled to a plurality of memory locations through a switching network, the data processors generating messages relative to specific ones of the memory locations, a method of operating a message combining switch having a message storage means interposed between and input port means, that is coupled to at least one data processor, and an output port means coupled to the memory locations, the method comprising the steps of:

receiving a message from the input port means;

comparing at least an identification of a memory location and a message operation type, associated with the received message, to an identification of a memory location and a message operation type that is associated with each of the messages stored within the message storage means;

identifying a stored message, if any, having at least the same memory location and same operation type as that associated with the received message, combining the received message and the identified stored message to generate a combined message; and replacing the identified stored message with the combined message, otherwise if no stored message is identified as having the same memory location and also the same operation type as the received message, storing the received message at an available storage location within the message storage means.

15. A method as set forth in claim 14 wherein the step of receiving includes a step of, if the message storage means has no messages stored within and if the output port means is available for use, coupling the received message to the output port means for transmission therefrom.

16. A method as set forth in claim 14 and further comprising a step of transferring messages from the message storage means to the output port means for transmission therefrom, the step of transferring being accomplished such that a first message stored within the message storage means is a first message transferred out of the message storage means.

17. A message combining switch comprising:

input port means for receiving a message, the received message including an operand, an indication of an operation type to be performed upon the operand, and an indication of a memory location associated with the operand;

message storage means having an input coupled to the input port means, the message storage means further having a first output, coupled to an output port means, and a second output;

means, having a first input coupled to the second output of the message storage means and a second input coupled to the input port means, for comparing each of the stored messages to a received message to identify a stored message, if any, having an indication of the operation type and an indication of the memory location that are both equal to an indication of the operation type and an indication of the memory location of the received message;

means, having a first input coupled to the input port means and a second input coupled to the second output of the message storage mans, and responsive to the operation of the comparing means, for combining the operand of the received message with the operand of an identified stored message; and means for replacing, within the message storage means, the operand of the identified stored message with the combined operand.

18. A message combining switch as set forth in claim 17 and further comprising means, responsive to the message storage means being empty upon a receipt of a message at the input node means, for bypassing the message storage means by coupling the received message to the output port means.

* * * * *